Dec. 6, 1960 F. G. OSTLAND 2,963,628

SWITCHING SEQUENCER

Filed May 8, 1957 3 Sheets-Sheet 1

INVENTOR:
Fredrick G. Ostland
By Louis A. Kline
John T. Matlago
His Attorneys

SWITCHING SEQUENCER

Filed May 8, 1957 3 Sheets-Sheet 2

INVENTOR:
Fredrick G. Ostland
By Louis A Kline
John T Matlago
His Attorneys

INVENTOR:
Fredrick G. Ostland
By Louis A Kline
John T. Matlago
His Attorneys

United States Patent Office 2,963,628
Patented Dec. 6, 1960

2,963,628

SWITCHING SEQUENCER

Fredrick G. Ostland, Santa Monica, Calif., assignor to The National Cash Register Company, Dayton, Ohio, a corporation of Maryland Filed May 8, 1957, Ser. No. 657,966

8 Claims. (Cl. 317—157)

The present invention relates to switching devices and more particularly to automatic means for controlling the setting of switches in accordance with a predetermined sequence.

In electronic computers, it is highly desirable to provide a switch timing device which makes it possible to turn on switches in a predetermined sequence to supply power to the various computer circuitry in the proper order so that the circuits operate safely and reliably. Thus it is highly desirable to first apply the A.C. supply to the circuits followed by the various D.C. power supplies after they have reached stable conditions. The circuits which control and render the arithmetic circuits operable can then be closed with assurance that the components used therein, such as crystal diodes, for example, will not have excessive voltages applied thereacross. It is next desirable to reset the computer program control circuits to the "rest" condition such that the supplying of power to the various computer units, such as the memory, can now be made without causing faulty operations. It is also desirable to allow certain test operations of the computer circuitry to be carried out after the various power supplies have been applied. It should be clear that this predetermined sequence for supplying power to the various components must be followed in the reverse direction upon shutting down the computer.

One of the objects of this invention is to provide a timing device which turns on the switches applying power to a computer, for example, in sequence, and which operates to turn off the switches in a reverse sequence.

Another object of this invention is to provide a sequencer with a latching mechanism which enables the sequencer to be automatically stopped at any one of a number of points of its operation.

Another object of this invention is to provide a manual selection switch circuit arrangement which enables the sequencer to reposition itself from its present stopping point to a new stopping point in either direction of its sequence.

Another object of this invention is to provide a sequencer which will reposition itself automatically either in response to a manual selection switch or in response to an external signal indicating a power failure, for example.

Briefly, the present invention comprises a shaft provided with a plurality of cams, each adapted to cooperate with a fast-acting switch. The shaft is turned in one direction by a motor which is engaged by a clutch to the shaft. Upon driving the shaft by the motor, a return spring, for example, is tightened on one end of the shaft such that, when the motor is disconnected by use of the clutch, the spring operates to rotate the shaft in its reverse direction back to its original setting. The shaft is also provided with a main latching wheel and a latching arm which can be controlled to stop the shaft at a predetermined one of a number of settings. The sequencer is further provided with a manual stop selecting switch including two switching decks, one for latching during rotation in the forward direction and the other for unlatching during rotation in the reverse direction. Thus, when rotating in the forward direction, as during startup, the latching switch deck acts to latch the latching wheel at the setting desired. After being once latched at a particular setting and desiring to latch at a setting in the reverse direction, the unlatching switch deck acts to maintain the latching wheel in an unlatched condition and then at the proper instant, in conjunction with the latching deck, acts to latch the shaft at the desired setting. The arrangement further provides rapid return of the sequencer to a predetermined stop point in the event that there is a malfunction of the supply circuits or, in the event that the switch fails to latch during its cycle, a limit switch is provided to return the shaft to its initial rest condition.

Referring to the figures.

Figures 1, 2:
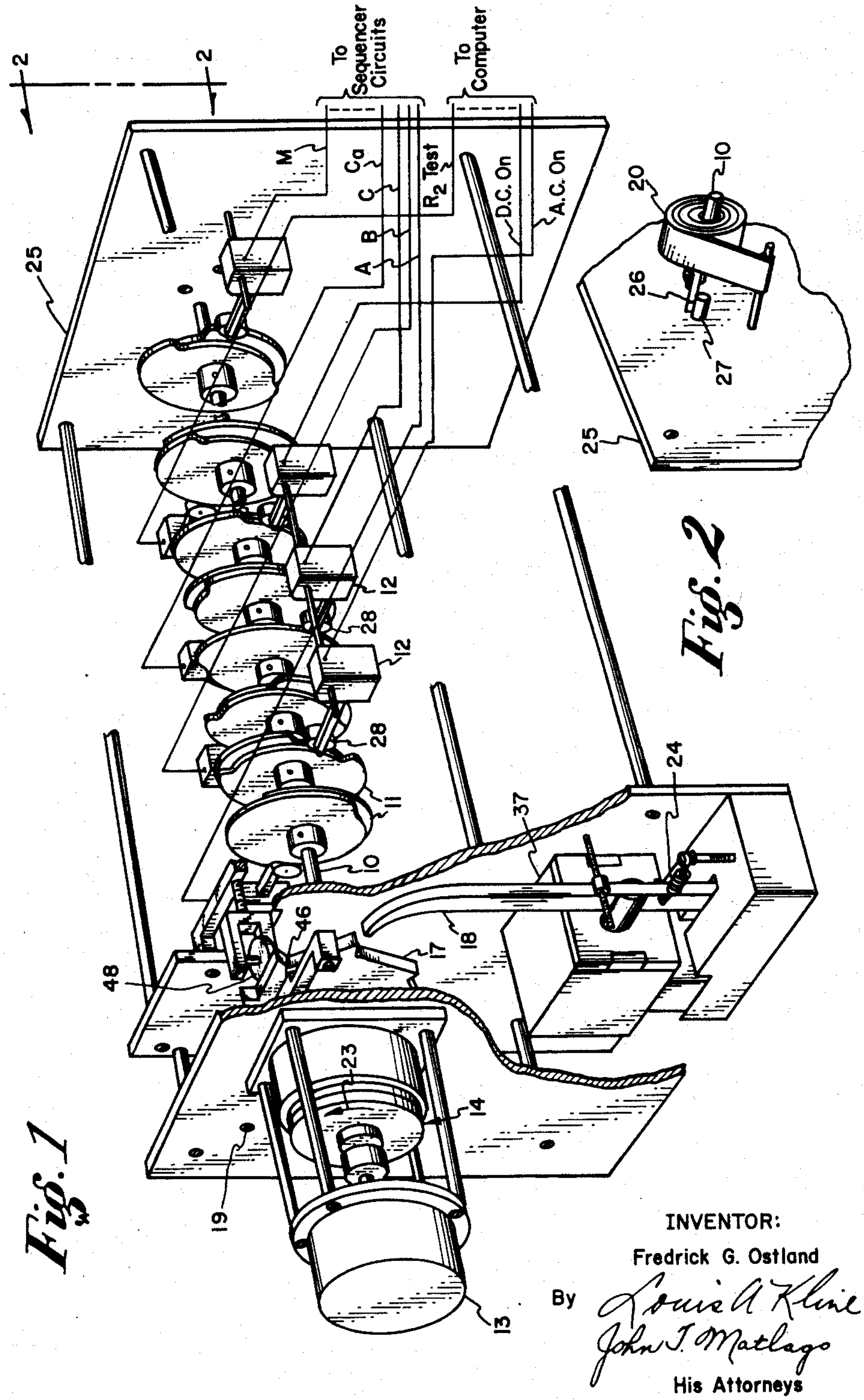
Fig. 1 is a perspective drawing of the switching sequencer showing the latching mechanism and cam arrangement.
Fig. 2 is a perspective drawing showing the return drive spring.

Referring first to Fig. 1, a perspective drawing is shown of the switching sequencer of the present invention. A rotatable shaft 10 supported in a suitable framework has a plurality of plate type cams 11 secured thereon, with the peripheral surface of each cam 11 in contact with a wheel 28 of a cam operated switch 12. The shaft 10 is driven in a direction as indicated by arrow 23, which is the forward sequence direction, by a constant r.p.m. motor 13 engaging the shaft 10 through clutch 14, and is driven in the opposite direction, which is the return sequence direction, by a return spring 20 (Fig. 2). A latching wheel 17 having a plurality of spaced stopping surfaces about its periphery is also provided on the shaft 10. As will be explained subsequently, each stopping surface represents a stopping position in the sequence of computer control. To maintain latching wheel 17 at a stopping position and prevent it from turning in a direction opposite from arrow 23, i.e., in the reverse sequence direction, by the action of a return spring 20 (Fig. 2) when the clutch 14 is disengaged, a latching arm 18 is provided to engage the stopping surfaces on the periphery of latching wheel 17. Latching arm 18 is brought into engagement with latching wheel 17 when the solenoid of latching relay 37 is energized, and is disengaged from latching wheel 17 by the action of spring 24 when latching relay 37 is deenergized.

Referring also to the detailed perspective drawing of Fig. 2, the return spring arrangement, which is at the end of shaft 10 opposite from motor 13, will be explained. Return spring 20, which is of the flat coil type, is attached at one end to plate 25 of the framework and at the other end to shaft 10. Bar 26, which is attached to shaft 10 for forward rotation, contacts spring stop 27 which is affixed to plate 25 of the mounting framework, thus holding the sequencer in a rest position which is the initial starting position of the shaft 10. Having once been rotated out of the rest position by motor 13, the action of return spring 20 rotates shaft 10 in the opposite direction to that indicated by arrow 23, to a rest position as determined by spring stop 27, when motor 13 is deenergized and disengaged from shaft 10 by clutch 14 and latching arm 18 is disengaged from the stopping surfaces of latching wheel 17.

In order to control the speed of shaft 10 when driven by return spring 20, and to absorb shock when latching, a brake 46, which is of a resilient material, is mounted against one flat surface of latching wheel 17 by bolts, as 19. A thrust wheel 48 is maintained against the other flat surface of latching wheel 17 to prevent axial movement of shaft 10 due to the force of brake 46.

For simplicity of assembly, the cams 11 are of the adjustable type and the cam operated switches 12 are of the type which may be arranged so as to be actuated either when wheel 28 is in contact with the large or small diameter peripheral surface of cam 11. Each cam 11 is arranged to actuate a cam operated switch 12 in a desired sequence as the shaft 10 is rotated, some of the cam operated switches 12 controlling the operation of the sequencer itself and some turning on the computer power or controlling computer test procedures. The output lines of some of the cam operated switches 12, such as lines from the switches denoted A, B, C, $C_a$, and M, control the operation of the circuitry of the sequencing device, as will be explained. The output lines of other cam operated switches 12, such as lines from switches denoted "A.C. On," "D.C. On," and "$R_2$ Test," pass to a computer to control power supply to computer elements and to control computer test procedures.

Figure 3:
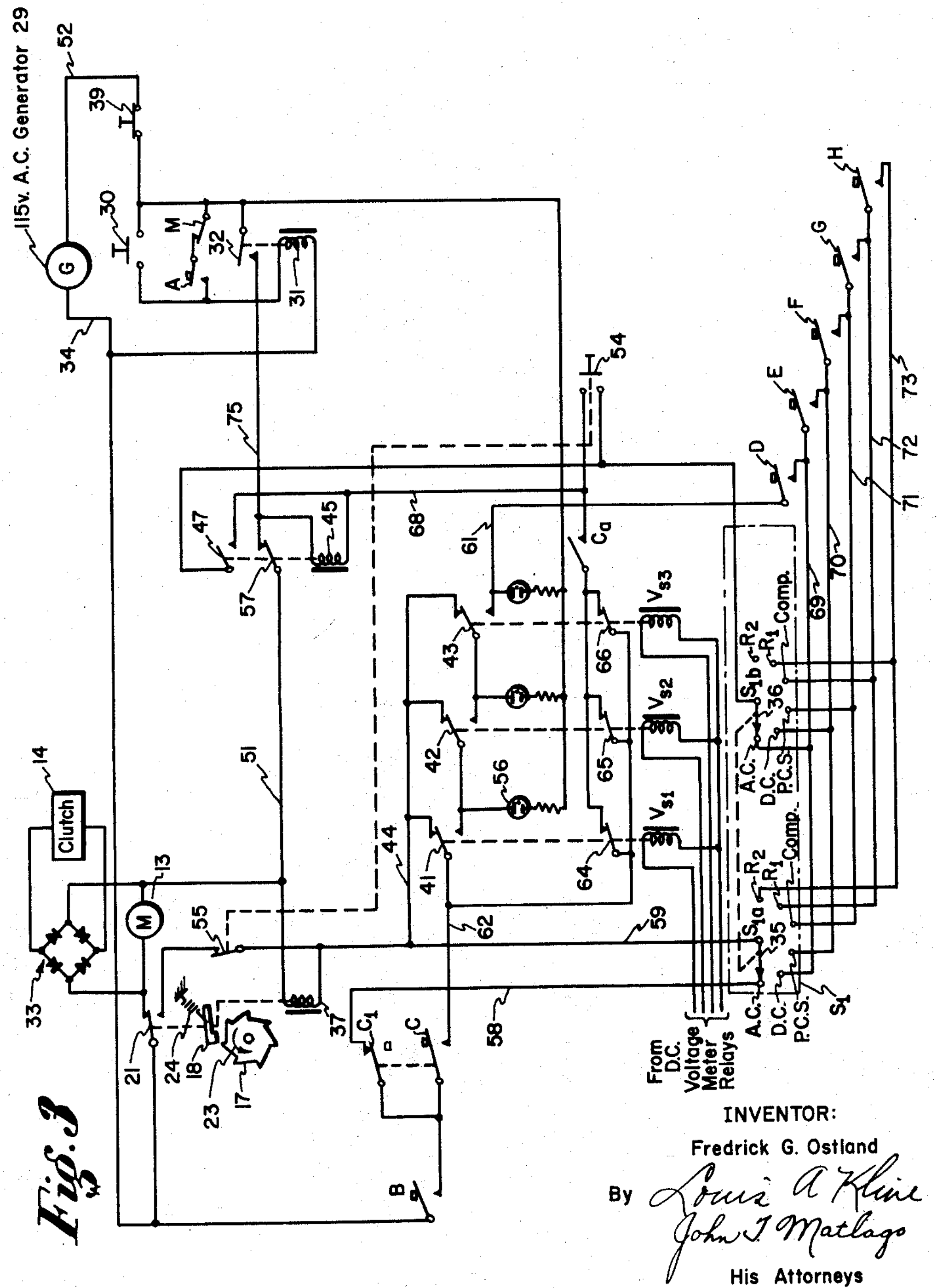
Fig. 3 is a diagram of the electrical circuits for controlling the sequencer.
Figure 4:
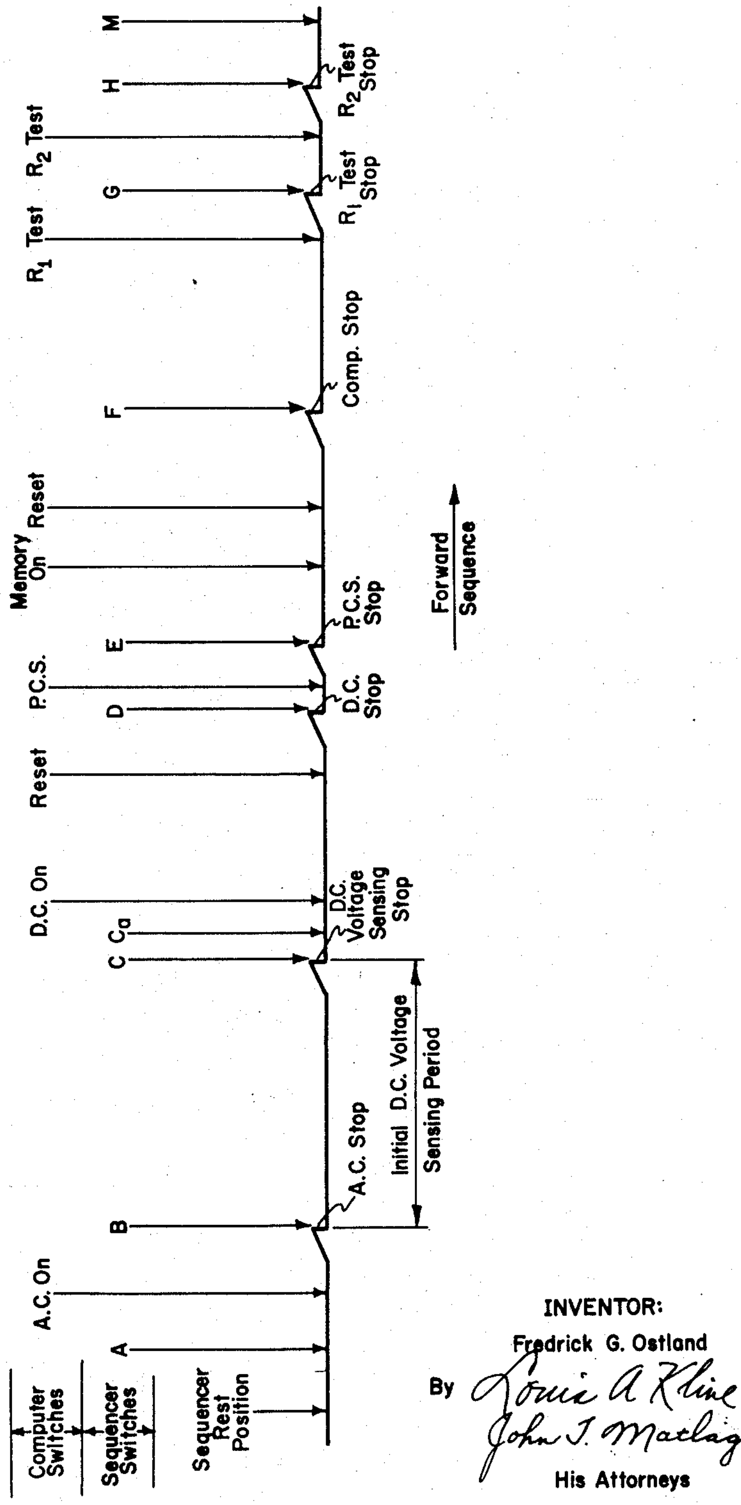
Fig. 4 is a timing diagram showing the order in which the cam operated switches are set during rotation of the sequencer.

The operation of the sequencer will be further explained by referring to Fig. 3 showing a diagram of the electrical circuits and to Fig. 4 showing a timing diagram of the switching sequencer indicating the relative positions at which the cam operated switches are turned on in relation to the stop positions on the latching wheel 17 (Fig. 1).

Alternating current is supplied to the circuits of Fig. 3 from a 115 volt A.C. generator 29 from which line 52 is connected to normally opened pushbutton switch 30. When switch 30 is closed, current passes from A.C. generator 29 through line 52, through holding relay 31 and back to A.C. generator 29. This circuit closes switch 32 and supplies the A.C. through line 75, through normally closed switch 57, through line 51, through motor 13, and through clutch 14 by way of rectifying device 33, through switch 21 to line 34 and to the other side of A.C. generator 29. This causes the clutch 14 to be engaged and the motor 13 to rotate. Motor 13 has a speed such that shaft 10 is driven on the order of 1 r.p.m. for the preferred embodiment. It is to be noted that the switches of Fig. 3 are shown in their normal position when the sequencer is in its initial rest position, i.e., with bar 26 positioned against spring stop 27 (Fig. 2). As shown by the timing diagram of Fig. 4, immediately after the shaft starts to rotate from the sequencer rest position, sequencer cam operated switch A is closed. This completes the circuit of Fig. 3 supplying the 115 volt A.C. source to holding relay 31, thus keeping switch 32 closed after switch 30 has been released. Power to the circuitry can be stopped by opening a normally closed switch 39 to deenergize holding relay 31 and thereby open switch 32. As the shaft 10 continues to rotate, computer cam operated switch "A.C. On" (Fig. 4) is closed to cause A.C. power to be furnished to the power supply of the computer. Immediately following this the rotation of the shaft 10 causes the sequencer cam operated switch B in Fig. 3 to be closed.

The manual switch $S_1$ of this circuit will now be explained. Switch $S_1$, which is comprised of two decks $S_{1a}$ and $S_{1b}$, has contact positions A.C., D.C., P.C.S., etc. for setting the computer power supply and test control to any desired condition by rotating interconnected arms 35 and 36. Each of the contact positions of switch $S_1$, such as contacts A.C., D.C., P.C.S., Comp., $R_1$, and $R_2$, corresponds to a stop position, such as A.C. stop, D.C. stop, P.C.S. stop, Comp. stop, $R_1$ Test stop, and $R_2$ Test stop, respectively, on the peripheral surface of latching wheel 17, which stop positions are shown in the timing diagram of Fig. 4 in sequential relation to the cam operated switches. It is to be noted that the other stop position shown in Fig. 4, which is the D.C. Voltage Sensing stop, is not controlled by a manual setting of switch $S_1$, but is controlled by voltage meter relays in the computer, as will be explained subsequently.

The closing of sequencer cam operated switch B will close a circuit from line 34 through switch $C_1$ to the A.C. contact of switch deck $S_{1a}$. If the arm 35 of switch deck $S_{1a}$ is set on the A.C. contact, latching relay 37, which is connected to one side of generator 29 through switch 57, is also connected to the other side of generator 29 through line 59 which connects to arm 35, thus energizing latching relay 37 and bringing latching arm 18 in contact with the peripheral surface of latching wheel 17. Simultaneously, switch 21 is moved to its hold contact, thus disconnecting the A.C. power through line 34 to motor 13 and clutch 14. To prevent motor 13 and clutch 14 from disconnecting until latching arm 18 can contact the engaging surface of latching wheel 17, switch 21 is arranged to be moved to disconnect motor 13 and clutch 14, only by latching arm 18 reaching its engaging condition. Under these conditions, the return spring 20 (Fig. 2) tends to rotate the shaft 10 in the reverse sequence direction, but due to the engagement of the latching arm 18 on the latching wheel 17, the shaft 10 will be latched or maintained at the A.C. stop, as shown in Fig. 4.

If the arm 35 of switch deck $S_{1a}$ of manual switch $S_1$ is not set on its A.C. contact, the latching relay 37 will not become energized by a closed circuit between line 58 and line 59 and the shaft 10 will continue its rotation in the forward sequence direction. Having supplied the A.C. power to the power supply of the computer, the D.C. power circuits of the computer will settle into their proper states within the time represented by the initial voltage sensing period which is about 20 seconds for the preferred embodiment. During this period, the D.C. voltage lines of the computer power supply are sensed by D.C. voltage meter relays (not shown) which energize relays $V_{s1}$, $V_{s2}$, and $V_{s3}$ when the proper voltage levels are obtained, to disconnect switches 41, 42, and 43, respectively, from line 44, thereby disconnecting the circuit between line 62, which connects to A.C. generator 29 when cam operated switch C is closed, and line 44 which connects to latching relay 37. If it so happens that the voltage meter relays do not show that the proper D.C. levels have been reached by the time that the sequencer cam operated switch C (Fig. 4) is closed at the end of the initial D.C. voltage sensing period, the source of power of A.C. generator 29 is connected through line 34, through fast-acting switch C, through line 62, through any of switches 41, 42, or 43, and through line 44 to latching relay 37, thus energizing latching relay 37. Energizing latching relay 37 moves latching arm 18 against the D.C. Voltage Sensing stop of latching wheel 17 and moves switch 21 to disconnect motor 13 and clutch 14. Indicator lights, such as 56, are provided to be illuminated when relays $V_{s1}$, $V_{s2}$, and $V_{s3}$ are energized to indicate that the computer D.C. voltage is at its proper level. It should be noted that the stopping of the sequencer at this point, because at least one of the relays $V_{s1}$, $V_{s2}$, or $V_{s3}$ is not activated, is made irrespective of the setting of the manual switch $S_1$, and is an indication of a failure of the D.C. power supplies. Thus it can be seen that it is not until all of the D.C. levels of the computer power supply have been reached that the energizing of latching relay 37 can be prevented such that rotation of the sequencer can be continued. It should be noted at this time that switches 64, 65, and 66 are also opened when relays $V_{s1}$, $V_{s2}$, and $V_{s3}$ are energized as a result of the voltage meter relays reaching the proper voltage levels, to disconnect the source of power from A.C. generator 29 through lines 34 and 62 and through switches 64, 65, and 66 to cam operated switch $C_a$.

Immediately after the shaft continues to rotate past the D.C. Voltage Sensing stop, cam operated switch $C_a$ is closed, thus allowing the source of power of A.C. generator 29 to be connected through line 62 to one side of unlatching relay 45 if any of the switches 64, 65, or 66 should be closed by release of relays $V_{s1}$, $V_{s2}$, or $V_{s3}$, respectively, at any subsequent time because of a failure of the D.C. power supply to the computer. Since the other side of unlatching relay 45 is connected to A.C. generator 29 through lines 75 and 52, closing of any of switches 64, 65, or 66 will energize unlatching relay 45 to cause switch 57 to be opened, thus disconnecting motor 13 and clutch 14 from the source of power through line 52 and releasing latching relay 37 if it is in a latched position. Shaft 10 (Fig. 1) will then rotate in a reverse sequence direction by the action of return spring 20 (Fig. 2) until cam operated switch $C_a$ is again opened. Upon the opening of cam operated switch $C_a$, unlatching relay 45 is deenergized since it is disconnected from the source of power of A.C. generator 29 through line 34 and line 62, to cause switch 57 to be closed, thus supplying power to motor 13 and clutch 14. However, simultaneously, latching relay 37 is energized to bring latching arm 18 into contact with latching wheel 17 and to move switch 21 against its hold contact, thereby disconnecting motor 13 and clutch 14 from the source of power through line 34. Latching arm 18 contacts the D.C. Voltage Sensing stop of latching wheel 17 and maintains this position until the voltage meter relay of the computer is manually reset.

As the sequencer continues to rotate after the closing of sequencer switch $C_a$, the cam operated switch "D.C. On" is closed which supplies D.C. power to all of the computer circuitry except the memory, as will be explained. The next cam operated switch to be closed is the computer switch "Reset" which allows a logical signal to pass to the computer that sets the program control to a "rest" block, i.e., to a starting condition in order to prevent possible undesired reading or writing of information stored in the memory, when the memory is subsequently supplied with power. Thus, regardless of the point in an operational command that the computer program control is residing in at the time the D.C. voltages are applied, the "Reset" switch will reset the program control to the "rest" position.

The next cam operated switch to be closed is sequencer switch D connecting the A.C. power source of generator 29 through line 34, through line 62, through switches 41, 42, and 43, and through line 61 to line 69. If arm 35 of switch deck $S_{1a}$ is set at the D.C. contact, line 69 is connected through arm 35 and through line 59 to latching relay 37. Thus latching relay 37 is energized to engage latching arm 18 at the D.C. stop of latching wheel 17 and to move switch 21 to disconnect the motor 13 and clutch 14 from the source of power through line 34.

The next cam operated switch to be closed in sequence is computer switch "P.C.S." which supplies a logical test signal to the program counter of the computer to cause it to advance through certain portions of its operation for test purposes. Next in sequence, the sequencer cam operated switch E is closed, which causes the sequencer to latch at the P.C.S. stop (Fig. 4) if switch $S_1$ is set at the P.C.S. contacts. This latching action is similar to that at the D.C. stop, as discussed, except the power source of A.C. generator 29 is connected from line 61 through cam operated switches D and E, hrough line 70 and arm 35 and through line 59 to energize latching relay 37. Since the cam operated switch "P.C.S." provides a test signal to the computer, it remains on at the P.C.S. stop, but immediately after the sequencer rotates past this point, the cam 11 is arranged so that cam operated switch "P.C.S." is again opened.

As the sequencer continues to rotate, the next cam operated switch to be closed is computer switch "Memory On" supplying a signal to the computer to turn on the power supply to the main memory. The next cam operated switch to be closed is computer switch "Reset" which functions to set the program counter to a starting condition similar to the computer switch "Reset" before the power to the memory was turned on. This computer switch "Reset" after the memory power is turned on is provided so the program counter will be set to a starting condition before turning the memory power off during reverse sequence rotation.

The next cam operated switch to be closed is sequencer switch F which latches the sequencer at Comp. stop if switch $S_1$ is at its Comp. contacts. This latching action is similar to the latching at the D.C. stop, as discussed, except the power source of A.C. generator 29 connects from line 61 through cam operated switches D, E, and F to line 71 and through arm 35 and line 59 to energize latching relay 37.

Two additional stops, $R_1$ Test stop and $R_2$ Test stop, are provided for computer testing procedures. The next cam operated switch to be closed is computer switch "$R_1$ Test" which allows a logical test signal to pass to the computer, followed by the closing of sequencer cam operated switch G. Upon the closing of cam operated switch G, the sequencer will be latched at the first test position $R_1$ Test stop if switch $S_1$ is set at the $R_1$ contact. This latching action is similar to the latching at the D.C. stop, as discussed, except the power source of A.C. generator 29 is connected through line 61, through cam operated switches D, E, F, and G, through line 72, through arm 35, and through line 59 to energize latching relay 37. Since this test signal is only required at $R_1$ Test stop, as the sequencer continues to rotate to the second test position, the cam operated switch "$R_1$ Test" is again opened by the action of the cam 11.

The next cam operated switch to be closed in sequence is computer switch "$R_2$ Test" which allows a second test signal to pass to the computer. Immediately following the closing of this cam operated switch, cam operated switch H is closed causing the sequencer to latch at $R_2$ Test stop if switch $S_1$ is set at the $R_2$ contacts. This latching action is similar to the latching at the D.C. stop, as discussed, except the power source of generator 29 connects through line 61, through cam operated switches D, E, F, G, and H to line 73, through arm 35, and through line 59 to energize latching relay 37.

If the sequencer is not stopped for some reason, cam operated switch M, which is a fail safe limit switch, opens. This condition disconnects the A.C. supply to holding relay 31, thus opening switch 32 and disconnecting the A.C. power to the circuitry. Thus motor 13 is stopped, clutch 14 is disengaged, latching arm 18 is disengaged from latching wheel 17, and the shaft 10 is rotated by the action of return spring 20 (Fig. 2) back to the initial sequencer rest position in the reverse sequence direction, opening and closing the cam operated switches in the opposite order of the forward sequence.

The sequencer not only will rotate to a stop position from the initial sequencer rest position (Fig. 4), but will rotate from one stop position to a second stop position either in a reverse sequence or forward sequence direction as determined by the setting of switch $S_1$. Assuming that the sequencer is latched at its $R_2$ Test stop, as discussed above, and that it is desirable to reverse the shaft 10 (Fig. 1) to the Comp. stop position, switch $S_1$ is changed to the Comp. contacts. It is to be noted that latching relay 37 is maintained in the energized condition which changing the setting of switch $S_1$ since the power source of A.C. generator 29 is connected through line 34, through the hold contact of switch 21, and through holding switch 55 to latching relay 37. After the setting has been made, switch 54 is closed and the A.C. power source of A.C. generator 29 through line 52 and line 75 is connected through normally unenergized unlatching relay 45, through switch 54, through arm 36, through line 72, through cam operated switches G, F, E, and D, through line 61 to line 62, and through line 34 back to A.C. generator 29. This condition energizes unlatching relay 45 which opens switch 57, thus disconnecting motor 13, clutch 14, and latching relay 37 from the source of power through lines 52 and 75. Thus latching arm 18 is disengaged from latching wheel 17 and switch 21 is moved from its hold contact. However, although switch 21 is moved, the source of power from generator 29 is still connected through switch deck $S_{1a}$ and through line 59 to one side of latching relay 37. Therefore, energizing unlatching relay 45 allows motor 13 and clutch 14 to be disconnected from the power while latching relay 37 is in the unenergized condition. When switch 54 is released, switch 47 maintains unlatching relay 45 in the energized condition.

Immediately upon disconnecting the motor 13, return spring 20 (Fig. 2) starts returning the shaft 10 (Fig. 1) in the reverse sequence direction, opening the cam operated switches H and G in turn. At the instant cam operated switch G opens, unlatching relay 45 is disconnected from the source of power which passes through line 61 from A.C. generator 29 causing unlatching relay 45 to return to its unenergized condition, closing switch 57 and opening switch 47. Thus the source of power of the A.C. generator 29 through line 52 is connected across the motor 13 and clutch 14 and the motor starts rotating the shaft 10 in the forward sequence direction. However, at the same instant, latching relay 37 is also energized pulling latching arm 18 into engagement with latching wheel 17 and moving switch 21 against its hold contact, thus disconnecting motor 13 and clutch 14 from the source of power through line 34. It is to be noted that after cam operated switch G opens, the inherent delay in the relays 37 and 45 prevents latching arm 18 from contacting the surface of latching wheel 17 until the $R_1$ Test stop has rotated in reverse direction past the engaging position. Thus the shaft 10 (Fig. 1) continues to be rotated in its reverse sequence direction by return spring 20 (Fig. 2), with the arm 18 in contact with the peripheral surface of latching wheel 17 such that at the instant arm 18 hits the Comp. stop on latching wheel 17, it will be maintained in that position.

Cam operated switches D, E, F, G, and H are connected to switch deck $S_{1b}$ in such a manner as to allow latching relay 37 to be energized, during rotation in the reverse sequence direction, one stop position prior to the stopping point as defined by the setting of its contacts. As discussed, during rotation in the forward sequence direction, latching relay 37 is energized at the contacts A.C., D.C., P.C.S., Comp,, $R_1$, and $R_2$, connecting a circuit through switch deck $S_{1a}$ to latching relay 37 upon the closing of cam operated switches C, D, E, F, G, or H, respectively. For latching during rotation in the reverse sequence direction, each contact A.C., D.C., P.C.S., Comp., and $R_1$ of switch deck $S_{1b}$ is connected to lines 69 to 73 so as to disconnect a circuit through switch deck $S_{1b}$ causing latching relay 37 to be energized, as discussed, upon opening of cam operated switches D, E, F, G, or H, respectively. Since contact $R_2$ is at the end of the sequence, it is not required to be connected for reverse sequence latching.

Assuming that the sequencer has been latched at the Comp. stop position and it is desirable to change the sequencer to the $R_1$ Test stop position, switch $S_1$ is first moved to the $R_1$ contacts. Then switch 54 is closed, but unlatching relay 45 is not energized since the 115 volt A.C. source of power is not connected from A.C. generator 29 through line 34, through line 62 to line 61, through cam operated switches D, E, F, G, and H to line 73, through arm 36 of switch deck $S_{1b}$, and through switch 54 to unlatching relay 45, since cam operated switches G and H are open at the Comp. stop of the sequencer. Thus, unlatching relay 45 is not energized and switch 57 remains closed. At the same time, holding switch 55 is opened and power from line 34 which passes through switch 21 is disconnected from latching relay 37. Also, arm 35 of switch deck $S_{1a}$ is now at the $R_1$ contact and latching relay 37 is not connected through line 59, arm 35, line 72, and cam operated switches G, F, E, and D to line 61 since cam operated switch G is open. Thus latching relay 37 is deenergized and switch 21 is moved, connecting motor 13 and clutch 14 through line 34 to the power source of A.C. generator 29, and shaft 10 starts to rotate in a forward sequence direction. Upon the closing of cam operated switch G, latching relay 37 is again energized through switch bank $S_{1a}$ causing latching arm 18 to contact the $R_1$ Test stop of latching wheel 17, and motor 13 and clutch 14 to be disconnected from the source of power upon the moving of switch 21 to its hold contact.

Thus, upon changing the setting of switch $S_1$ and pressing switch 54 for an instant, the sequencer will move either in a forward or reverse sequence direction to its new setting.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A device for supplying power to a computer in a predetermined sequence, comprising: first means including rotary cam-shaft means comprising a shaft and a plurality of cams rotatable therewith; second means, including electrical driving means, for driving said shaft in each of forward and reverse rotational directions; third means, including electrically actuated latch means, for latching said shaft at any one of a plurality of rotational stopping positions; fourth means, including a plurality of switch means, connected to said driving means and to said latching means and each switch means arranged for actuation by a respective one of said cams and each corresponding to and arranged for actuation at a respective stopping position of said shaft; fifth means, including a selector switch having a series of contacts each representing and corresponding to a respective stopping position of said shaft; and a plurality of control circuits, each said control circuit corresponding to a respective one of said stopping positions and each including a respective contact of said selector switch and all the cam-actuated control switches corresponding to all stopping positions preceding that corresponding to the respective contact and also including that cam-actuated switch corresponding to the respective contact, each said control circuit operating to disable said driving means and to control said latching means to stop said shaft when the cam-actuated switch included in the respective control circuit selected by the setting of said selector switch is closed by the respective cam on said rotary cam-shaft means.

2. A switching device comprising: first means including rotary cam-shaft means having a plurality of cam surfaces; second means, including electrical drive means and electric power means, for rotating said cam-shaft means a partial-revolution in each of forward and reverse directions; third means, including electrically-actuated latching-and-switch means, connected to said power means, for latching said cam-shaft means at any of shaft-means, stopping-positions $n$ in number, and for concurrently disconnecting the power means from said electrical drive means; fourth means, including a manually-operable switch means having a principal pole and a first series of at least $n$ contacts and means for connecting the pole with any of the contacts; fifth means, including $n$ switches connected to be in series when closed and each corresponding to a respective one of said $n$ shaft-means stopping-positions and each constructed and arranged to be actuated by a respective one of said cam surfaces, and means connecting each of said $n$ switches to a respective one of said $n$ contacts of said switch means; sixth means, including circuit means, connecting said latching means to said electric power means through said manually operable switch means and said fifth means, whereby said driving means is selectively energized to drive said cam-shaft means to the shaft-means stopping-position corresponding to that one of said *n* switches connected to that one of said *n* contacts selectively connected to said principal pole in said manually-operable switch means.

3. A switching device according to claim 2, said second means including spring-motor means for driving said shaft means in said reverse directions, and including electrically-operated clutch means interposed between said electrical drive means and said shaft means and connected to be energized and deenergized concurrently with said electrical drive means and connecting the electrical drive means for driving the shaft means only when energized and permitting the spring-motor means to reversely drive the shaft means when deenergized.

4. A switching device according to claim 3, said fourth means including a second principal pole and a second series of *n* contacts, and circuit means including means interconnecting corresponding contacts of said first and second series, and including manual switch means and relay means connected to said electric power means and effective upon closure of said manual switch means to energize said relay means and thereby disconnect said latching means and disconnect said electric drive means and clutch means to permit reverse rotation of said shaft means by said spring-motor means to that stopping position corresponding to that one of said *n* switches connected to that one of said second series of *n* contacts selected by said second principal pole.

5. Switching apparatus for closing circuits in sequence in a forward operation and for opening the circuits in the reverse sequence in a reverse operation, said apparatus comprising, in combination with terminal means of said circuits; first means including a rotary cam-shaft and cams; second means, including electric power means and electrical means comprising motor and clutch means, effective when energized to drive said cam-shaft and cams forwardly; third means, including spring drive means, capable of driving said shaft reversely and effective to do so following forward driving of said shaft means and deenergization of said clutch means; fourth means, including cam-actuable switches each arranged for actuation by a respective one of said cams, each switch of one set of said switches being connected to a respective one of said terminal means and a second set being arranged to perform control-circuit functions; fifth means, including electrically actuated latch-and-switch means and a stopping circuit, effective when energized to disconnect said motor and clutch means from said power means and effective when deenergized to connect said motor and clutch means to said power means, said latch-and-switch means also effective when energized to stop said cam-shaft and cams in one of a plurality of determined stopping-positions; sixth means, including relay-and-circuit means, connected to said power means and effective when energized to deenergize said latch-and-switch means; seventh means, including switch and circuit means, connected to said power means effective when energized to open said relay-and-circuit means to deenergize said relay-and-circuit means and thus cause deenergizing of said latch-and-switch means, whereby to deenergize said motor and clutch means and stop said cam-shaft and cams; and means comprising first and second multiple-setting switches, arranged for selection of any of respective ones of said stopping-positions, each multiple-setting switch having a main pole and a plurality of selector contacts respective ones of which correspond to respective ones of said stopping-positions and are connected to respective ones of said second set of switches, and said first multiple-setting switch connected to said latch-and-switch means to energize the latter when the circuit means is closed through any selected one of said selector contacts and through the respective cam-actuable switch, to thereby stop forward rotation of said cam-shaft at the stopping-position corresponding to said one of said selector contacts.

6. Switching apparatus according to claim 5, including switch-and-circuit means connecting said second multiple-setting switch and said relay-and-circuit means, for maintaining said relay energized for reverse rotation of said cam-shaft and cams to the stopping-position corresponding to that one of said second set of cam-actuable switches connected to the selected one of the selector contacts of the second multiple-setting switch.

7. An electrical switch unit comprising, in combination: first means, including a power source and a plurality of cam-operable switches, arranged to connect the power source to terminals of some only of said switches in a forward sequence and to disconnect the power source from such terminals in the reverse sequence; second means, including a rotary cam-shaft having cams each arranged to operate a respective one of said cam-operable switches; third means, including electric motor means and electric clutch means connected in a motor-and-clutch circuit, arranged for driving said shaft in a forward direction when energized and for releasing said shaft when deenergized; fourth means, including spring means, constructed and arranged to tend to drive said shaft in reverse direction and effective to do so incident to the shaft being free to reversely rotate; fifth means, including electrically operable latch-and-switch means having an operating coil and having a latch wheel on said shaft, connected to said motor-and-clutch circuit and operable when energized to latch said shaft in any of a plurality of stopping positions and to concurrently open said motor-and-clutch circuit; sixth means, including circuit means and a relay means, connected to said power source and to said electrically operable latch-and-switch means and effective upon deenergization of said relay means to connect said power source means to said motor-and-clutch circuit for energization thereof and to said latch-and-switch means for energization of the latch means thereof; and seventh means, including circuit means and selector-switch means comprising selector-switch contacts each connected to a terminal of a respective one of the other of said cam-operable switches, connected to said power source and to said fifth means and effective to complete a circuit from said power source through a selected one of said other of said cam-operable switches and through said operating coil, to cause energization of said operating coil and stopping of said shaft at a selected one of said stopping positions.

8. A unit according to claim 7, including circuit means, and a manual switch, and a second selector-switch means having selector-switch contacts connected to respective corresponding selector-switch contacts of the first-named selector-switch means and also having a selector-pole connected to said power source through said manual switch and the coil of said first relay means, whereby said first relay means is energized incident to closure of said manual switch, to cause opening of the power supply to said electric motor means and to cause deenergization of said latch-and-switch means to release said shaft for reverse rotation, and whereby reverse rotation of said shaft and incident operation of a selected one of said other of said cam operated switches opens the power supply circuit through said second selector-switch and causes re-energization of said latch-and-switch means to stop said shaft at a stopping position corresponding to the selected selector-contact of said second selector-switch.

References Cited in the file of this patent

UNITED STATES PATENTS

| | | |
|---|---|---|
| 1,020,185 | Bullard | Mar. 12, 1912 |
| 2,500,956 | Mershon | Mar. 21, 1950 |
| 2,805,368 | Nicolaus | Sept. 3, 1957 |
| 2,820,860 | Kozikowski | Jan. 21, 1958 |